Dec. 17, 1929.  H. JUNKERS  1,740,021
ASSEMBLING AND REPAIRING FLYING MACHINES
Filed July 22, 1925  2 Sheets-Sheet 2
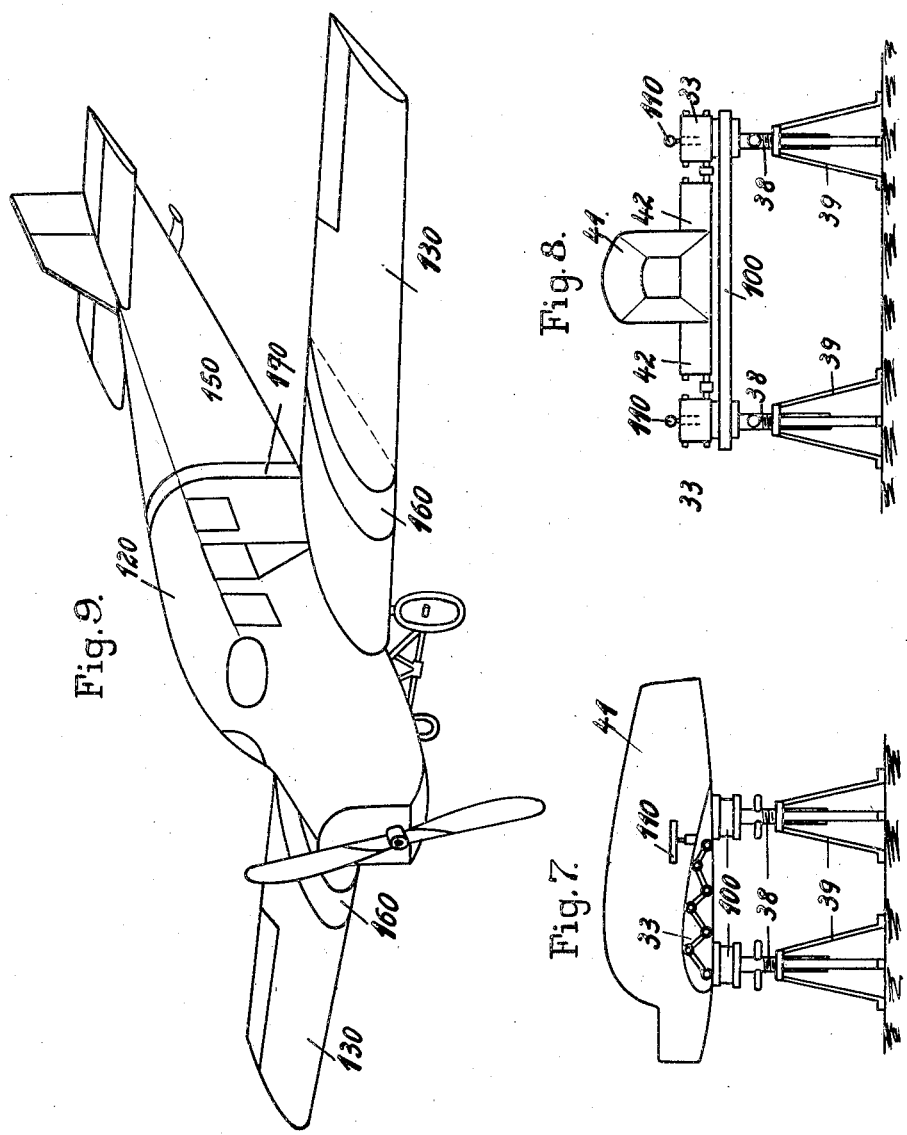

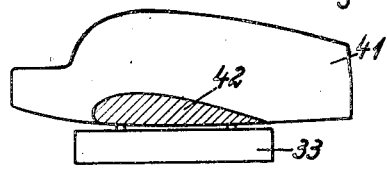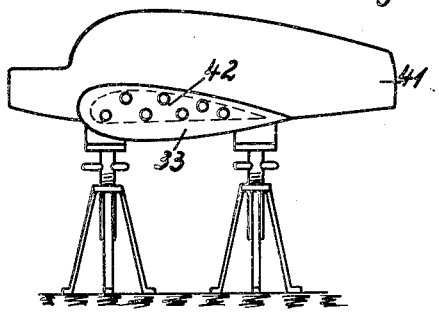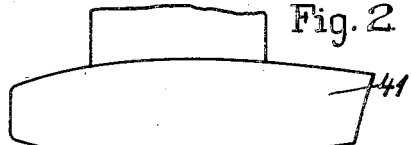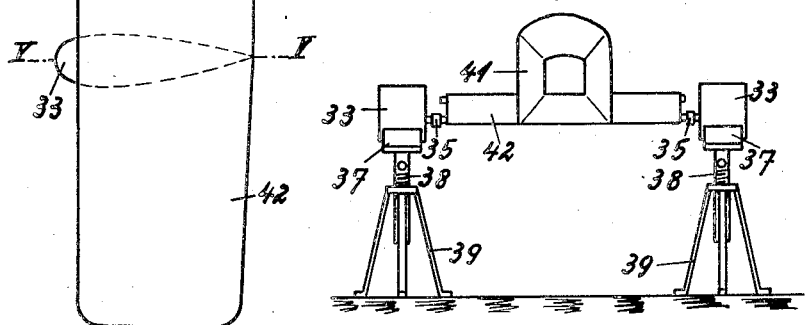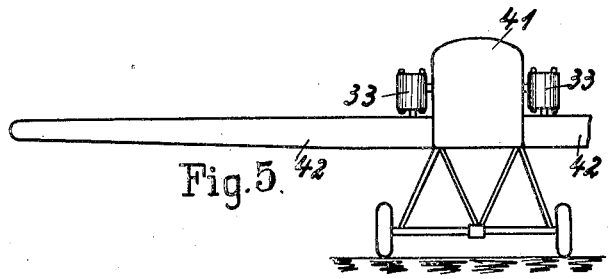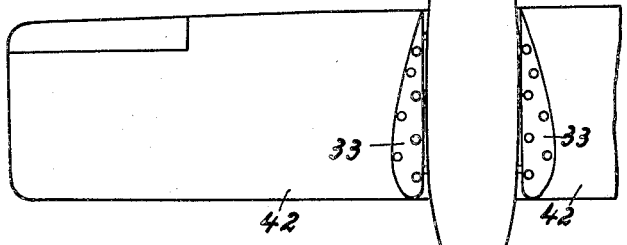

Patented Dec. 17, 1929

1,740,021

UNITED STATES PATENT OFFICE

HUGO JUNKERS, OF DESSAU, GERMANY

ASSEMBLING AND REPAIRING FLYING MACHINES

Application filed July 22, 1925, Serial No. 45,381, and in Germany August 9, 1924.

My invention relates to aircraft factory equipment and more especially to assembly forms for the assembling of the various units, which in their totality constitute an areoplane. It is an object of my invention to provide means whereby these units may be assembled rapidly and exactly, and damaged aeroplanes may be repaired at places where no other facilities for effecting such repairs are available.

To this end I provide means for transporting all the accessories which are required for such repairs, on a flying machine, these accessories being so arranged and formed that they can be mounted on and preferably inserted between structural parts of an aeroplane without interfering with its propulsion. My invention comprises the provision of relief aeroplanes allowing to dispense with other transporting means and to save time in repairing the damaged craft.

According to this invention the assembly forms for the assembling of the principal parts of an aeroplane, for instance the wings or the fuselage, are so designed that they can be secured to or inserted at the joints of parts of an aeroplane, for instance at the point where a wing is secured to a stump projecting from the central section of the aeroplane, the assembly forms being streamlined and in general so shaped as to fit in with the general configuration of the wing or the fuselage of the aeroplane. If the assembly forms are inserted at the joints of parts of an aeroplane, the cables or the like serving for the control of the rudder or the like must be made correspondingly longer.

My invention may be utilized to particular advantage where the relief aeroplane is of the same type as the aeroplane to be repaired as in this case the assembly forms may be equipped with the connecting members such as screws, bolts, or the like mounted in the correct position.

The relief aeroplane should carry not only the assembly forms but all other auxiliaries required, such as tools, spare parts and the like. When the assembly forms have been removed, the relief aeroplane may be used for other purposes, while the repaired aeroplane, if of the same type, may take home the assembly forms and other accessories.

In the drawings affixed to this specification and forming part thereof a stationary and a portable device embodying my invention are illustrated diagrammatically by way of example. In the drawings Fig. 1 is an elevation, partly in section, on the line V—V in Fig. 2, showing part of an aeroplane with an assembly form secured below one of its wings, Fig. 2 is a corresponding plan view, Figs. 3 and 4 are a side and an end elevation, respectively, of part of an aeroplane showing assembly forms, fitted in position for repair, Figs. 5 and 6 are a front elevation and a plan view, respectively, of part of an aeroplane, in which the assembly forms are secured above the wing on either side of the fuselage, Figs. 7 and 8 are similar views showing assembly forms adapted to be inserted at the wing joints of an aeroplane, and Fig. 9 is a perspective view of a relief aeroplane with assembly forms inserted in the wings.

Referring first to Figs. 1 and 2, 41 is the fuselage and 42 is one of the wings of an aeroplane. 33 is an assembly form which is so designed as to be secured to the wing 42 by readily detachable means and without impairing the propulsion of the aeroplane.

During the repair, the assembly forms 33 which are equipped with the necessary screw sockets 35 or the like as shown in Fig. 4 are mounted on supports 39 adjustable by means of spindles 38 and gibs 37. If the fuselage has been damaged to the extent of lacking the necessary rigidity, ties 100 may be inserted between the gibs 37 as shown in Figs. 7 and 8.

As illustrated in Figs. 3 and 4, the assembly forms 33 may be mounted above the wings 42 on either side of the fuselage 41. Obviously such forms might also be mounted on any other suitable part of an aeroplane, for instance below the fuselage or on the landing chassis.

Figs. 7 and 8 illustrate assembly forms 33 adapted to be inserted between the wings 130 and stumps 42 of a relief aeroplane or between the stumps and the wings (not shown) of a damaged aeroplane. The cross-section of these forms is the same as the wing section so that they can be secured to the stumps and wings, respectively, of the damaged aeroplane. The assembly forms 160 are supported on spindles 38 adjustable in supports 39 and a tie 100 is inserted between each pair of supports. Sighting tubes 110 may be arranged on the assembly forms 33 in order to allow adjusting the forms with regard to important points of the aeroplane.

Fig. 9 illustrates assembly forms 160 in position between the wings 130 and the stumps of the relief aeroplane and it also illustrates an assembly form 170 for the fuselage inserted between the central section 140 and the tail section 150 of the aeroplane.

Obviously further assembly forms may be inserted at other joints of the aeroplane, for instance between the engine support and the central section.

I wish it to be understood that I do not desire to be limited to the exact details of construction shown and described, for obvious modifications will occur to a person skilled in the art.

I claim:—

1. An assembly unit for the construction and repair of flying machines comprising a stream-lined box-like part, means on said part for fixing the same to a flying machine to form a part thereof, and means for supporting said part in position above the ground.

2. A templet unit for use in the construction and repair of flying machines, comprising a body member having members thereon arranged in the position to be assumed by structural elements of a section of a machine to be constructed or repaired, and means for connecting said body to a flying machine to form a part thereof to enable the unit to be transported to the place of repair or construction operation.

3. A templet unit for use in the construction and repair of flying machines, comprising a body member having a plurality of members thereon arranged in the position to be assumed by structural elements of a section of a machine to be constructed or repaired, and means coacting with said members for connecting said body member to a flying machine to form a part thereof to permit the unit to be transported to the place of repair or construction operation.

4. A templet unit for use in the construction and repair of flying machines, comprising a stream-lined body member of a cross section corresponding to the cross section of the part of a flying machine which is to be constructed or repaired, and means carried thereby for interlocking said section with a part of a flying machine whereby to facilitate transportation of the unit to the place of repair or construction operation, said means being arranged in the position to be taken by structural members forming a part of the section of the flying machine to be constructed or repaired.

5. A templet unit for use in the construction and repair of flying machines comprising a stream-lined body member of a cross section corresponding to the cross section of a wing of a flying machine and having thereon connecting fittings at opposite sides thereof for connecting said section at an intermediate position in the wing of a flying machine to facilitate transportation of the templet to the place of construction or repair operation, said fittings being arranged in the position to be assumed by spars in the wing of the machine to be constructed or repaired to serve as a guide for positioning said spars in the wing to be constructed or repaired.

6. The method of repairing a flying machine which comprises inserting in a flying machine construction a templet unit comprising a stream-lined part adapted to form a guide for the part of the machine to be repaired and having attachment means thereon, conveying said part to the machine to be repaired, removing said part from the conveying machine and then disposing it in position relative to the machine to be repaired to determine the arrangement of the structural parts thereof.

In testimony whereof I affix my signature.

HUGO JUNKERS.